US012214957B2

(12) United States Patent
Owen et al.

(10) Patent No.: US 12,214,957 B2
(45) **Date of Patent: *Feb. 4, 2025**

(54) SELF-CLEANING TANK

(71) Applicant: Spokane Stainless Technologies, Inc., Spokane Valley, WA (US)

(72) Inventors: Nathan Hayes Owen, Spokane Valley, WA (US); Nathan Scott Batson, Colbert, WA (US); Thomas Raymond Rodgers, Spokane, WA (US)

(73) Assignee: Spokane Stainless Technologies, Inc., Spokane, WA (US)

( * ) Notice: Subject to any disclaimer, the term of this patent is extended or adjusted under 35 U.S.C. 154(b) by 258 days.

This patent is subject to a terminal disclaimer.

(21) Appl. No.: 17/708,926

(22) Filed: Mar. 30, 2022

(65) Prior Publication Data

US 2022/0219888 A1 Jul. 14, 2022

Related U.S. Application Data

(60) Division of application No. 16/459,285, filed on Jul. 1, 2019, now Pat. No. 11,299,342, which is a division (Continued)

(51) Int. Cl.

*B08B 9/08* (2006.01)
*B01F 27/091* (2022.01)

(Continued)

(52) U.S. Cl.

CPC ........ *B65D 90/0093* (2013.01); *B01F 27/091* (2022.01); *B01F 27/808* (2022.01); *B01F 27/82* (2022.01); *B01F 35/123* (2022.01); *B01F 35/145* (2022.01); *B01F 35/32045* (2022.01); *B08B 9/0808* (2013.01); *B08B 9/087* (2013.01); *B65D 90/54* (2013.01); *B65D 88/68* (2013.01);

(Continued)

(58) Field of Classification Search

CPC ............ B08B 9/087; B65D 88/68; F28G 3/12
See application file for complete search history.

(56) References Cited

U.S. PATENT DOCUMENTS 1,608,391 A 6/1925 Hand et al.
1,625,721 A 4/1927 Hahn (Continued)

FOREIGN PATENT DOCUMENTS

CL 11132003 9/2004
CL 21182009 9/2010

(Continued)

OTHER PUBLICATIONS

Australian Office Action mailed Jun. 17, 2022 for Australian Patent Application No. 2021203190, a foreign counterpart to U.S. Pat. No. 9,381,550, 3 pages.

(Continued)

*Primary Examiner* — Michael D Jennings
(74) *Attorney, Agent, or Firm* — Lee & Hayes, P.C.

(57) ABSTRACT

A tank, such as a fermentation tank, includes a scraper blade assembly slideably coupled to a bottom surface of the tank. The scraper blade assembly includes a blade arranged to displace solids deposited on the bottom surface of the tank out through an aperture arranged flush with the bottom surface of the tank.

20 Claims, 9 Drawing Sheets

Related U.S. Application Data of application No. 15/172,941, filed on Jun. 3, 2016, now Pat. No. 10,336,534, which is a continuation of application No. 14/255,778, filed on Apr. 17, 2014, now Pat. No. 9,381,550.

(51) Int. Cl.

| | |
|---|---|
| ***B01F 27/808*** | (2022.01) |
| ***B01F 27/82*** | (2022.01) |
| ***B01F 35/10*** | (2022.01) |
| ***B01F 35/12*** | (2022.01) |
| ***B01F 35/32*** | (2022.01) |
| ***B08B 9/087*** | (2006.01) |
| ***B65D 90/00*** | (2006.01) |
| ***B65D 90/54*** | (2006.01) |
| *B65D 88/68* | (2006.01) |

(52) U.S. Cl.

CPC .... *Y10T 137/0435* (2015.04); *Y10T 137/4238* (2015.04)

(56) References Cited

U.S. PATENT DOCUMENTS

| | | | | |
|---|---|---|---|---|
| 1,660,242 | A | | 2/1928 | Thomson |
| 1,773,930 | A | | 8/1930 | Athon |
| 2,223,018 | A | | 5/1937 | Christensen |
| 2,552,452 | A | | 5/1951 | Phillips |
| 2,831,418 | A | | 12/1955 | Ponish |
| 2,782,013 | A | | 2/1957 | Dittrich |
| 2,858,117 | A | | 10/1958 | Girton |
| 3,160,400 | A | | 12/1964 | Harrison |
| 3,333,827 | A | | 8/1967 | Lodige |
| 3,362,690 | A | | 1/1968 | McSwain |
| 3,628,670 | A | | 12/1971 | McGuire et al. |
| 3,804,304 | A | | 4/1974 | Richter |
| 5,179,757 | A | * | 1/1993 | Grant, Jr. ................ B08B 9/087 15/104.07 |
| 5,222,269 | A | * | 6/1993 | Walker .................. F17C 13/002 15/56 |
| 5,590,963 | A | | 1/1997 | Schuler |
| 5,647,665 | A | | 7/1997 | Schuler |
| 6,703,055 | B1 | | 3/2004 | Klein et al. |
| 6,837,611 | B2 | | 1/2005 | Kuo |
| 8,820,586 | B2 | | 9/2014 | Ozawa et al. |
| 11,299,342 | B2 | * | 4/2022 | Owen .................. B01F 27/808 |
| 2004/0252583 | A1 | | 12/2004 | Van Der Plas |
| 2006/0104757 | A1 | | 5/2006 | Schroder et al. |
| 2007/0274151 | A1 | | 11/2007 | Albright |
| 2010/0039885 | A1 | | 2/2010 | Baker |
| 2010/0127106 | A1 | | 5/2010 | Fornasier et al. |
| 2011/0024418 | A1 | | 2/2011 | Batson |
| 2011/0031280 | A1 | | 2/2011 | Kato |
| 2012/0000917 | A1 | | 1/2012 | Ovnicek |
| 2014/0326327 | A1 | | 11/2014 | Owen et al. |
| 2016/0280458 | A1 | | 9/2016 | Owen et al. |
| 2020/0002084 | A1 | | 1/2020 | Owen et al. |

FOREIGN PATENT DOCUMENTS

| | | | |
|---|---|---|---|
| DE | 2853491 | | 12/1978 |
| DE | 4238591 | | 11/1992 |
| DE | 4238598 | | 3/1994 |
| EP | 0785018 | | 7/1997 |
| EP | 2179664 | | 4/2010 |
| FR | 1323230 | | 4/1963 |
| GB | 1399531 | | 7/1975 |
| JP | 51-115360 | | 10/1976 |
| JP | S51115360 | | 10/1976 |
| WO | WO2009057319 | A1 | 7/2009 |
| WO | WO2014182671 | A1 | 11/2014 |

OTHER PUBLICATIONS

European Office Action mailed Jul. 25, 2022 for European Patent Application No. 19182927.4, a foreign counterpart to U.S. Pat. No. 9,381,550, 5 pages.

Australian Office Action mailed Apr. 3, 2023 for Australian Patent Application No. 2021203190, a foreign counterpart to U.S. Pat. No. 9,381,550, 4 pages.

Australian Office Action mailed on Jun. 18, 2020 for Australian Patent Application No. 2019200727, a counterpart foreign application of the U.S. Pat. No. 9,381,550, 5 pages.

Chilean Office Action mailed Oct. 11, 2018 for Chilean patent application No. 1675-2015, a counterpart foreign application of U.S. Pat. No. 9,381,550.

Chilean Office Action mailed Mar. 15, 2018 for Chilean patent application No. 1675-2015, a counterpart foreign application of U.S. Pat. No. 9,381,550.

"Criveller Self Emptying Red Fermenters High", Wine Insustry Network, retrieved from <<https://www.youtube.com/watch?v=UQaZXcshoFo>>, Published May 20, 2013, 1 page.

Criveller Self Emptying Red Fermenters; page from 2012 Criveller Group product catalog; p. 32; 1 page.

European Office Action mailed Feb. 22, 2018 for European patent application No. 14795271.7, a counterpart foreign application of U.S. Pat. No. 9,381,550, 5 pages.

Extended European Search Report mailed Dec. 13, 2016 for European Patent Application No. 14795271.7, 8 pages.

Extended European Search Report mailed on Nov. 13, 2019 for European Patent Applicaiton No. 19182927.4, 10 pages.

JVNW Features; retrieved from http://jvnw.com/images/Literature/Brochures/wine/Wine_Features.pdf on Sep. 22, 2013; 2 pages.

JVNW Manways; retrieved from http://jvnw.com/Components/Manways.html on Sep. 22, 2013; 4 pages.

JVNW Wine Tanks; retrieved from http://jvnw.com/Industries/WineTanks.html on Sep. 22, 2013; 4 pages.

"Lautering Rake 6", Picture of a commonly used grain rake in a mash tun for making beer. Example of grain rakes that can move pneumatically up and down throughout the depth of the grain bed to stir the grain while it is cooking. Photo can be found on the internet if you do a search on mash tuns, retrieved Sep. 27, 2013, 1 page.

"Lautering Rake 2", Picture of a commonly used grain rake in a mash tun for making beer. Example of grain rakes that can move pneumatically up and down throughout the depth of the grain bed to stir the grain while it is cooking. Photo can be found on the internet if you do a search on mash tuns, retrieved Sep. 27, 2013, 1 page.

Final Office Action dtd Jan. 11, 2019 for U.S. Appl. No. 15/172,941 "Self-Cleaning Tank" Owen, 7 pages.

Office Action for U.S. Appl. No. 16/459,285, mailed on Aug. 13, 2021, Owen, "Self-Cleaning Tank", 6 Pages.

Office Action for U.S. Appl. No. 15/172,941, mailed on Oct. 11, 2018, Owens et al., "Self-Cleaning Tank", 6 pages.

Office Action for U.S. Appl. No. 14/255,778, mailed on Oct. 28, 2015, Nathan Hayes Owen, "Self-Cleaning Tank", 5 pages.

Partial machine translation of JP 51-115360, Oct. 9, 1976, 4 pgs.

Partial machine translation of DE4238598C1, Mar. 24, 1994, 13 pgs.

PCT Search Report and Written Opinion mailed Sep. 9, 2014 for PCT Application No. PCT/US14/36926, 9 Pages.

Rectangular Manway for Hydraulic / Pneumatic Applications; retrieved from http://www.manways.co.uk/product-detail.asp?prodid=431 on Feb. 11, 2014; 1 page.

* cited by examiner

SELF-CLEANING TANK

This application is a divisional of U.S. application Ser. No. 16/459,285, filed on Jul. 1, 2019 entitled "Self-Cleaning Tank", which is a divisional of U.S. application Ser. No. 15/172,941, filed on Jun. 3, 2016 entitled "Self-Cleaning Tank", which is a continuation of U.S. application Ser. No. 14/255,778, filed on Apr. 17, 2014 entitled "Self-Cleaning Tank", which claims priority to U.S. Provisional Application No. 61/820,009, filed on May 6, 2013, and entitled "Self-Cleaning Tank," both of which are incorporated herein by reference.

BACKGROUND

Tanks exist that have sloped bottoms to help empty and/or clean solids from the bottom of the tank. However, because these solids adhere to the bottom of the tank, some of the solids do not slide out of the tank. Thus, removal and/or cleaning of the deposited solids from the bottom of the tank is labor intensive, time consuming, and costly. Moreover, because workers must enter the confined space of the tanks to remove and/or clean the deposited solids from the bottom of the tank, the workers entering the confined space are exposed to hazardous confined space conditions and atmosphere.

Accordingly there remains a need in the art for a tank that is less labor intensive to clean, takes less time to clean, and does not require workers to enter the tank at any time.

SUMMARY

This summary is provided to introduce simplified concepts of a self-cleaning tank and method, which is further described below in the Detailed Description. This summary is not intended to identify essential features of the claimed subject matter, nor is it intended for use in determining the scope of the claimed subject matter.

In one example, a container comprising a tank for holding a product includes a scraper blade assembly slideably coupled to a bottom surface of the tank. The scraper blade assembly includes a blade arranged to displace solids deposited on the bottom surface of the tank through an aperture arranged in a wall of the tank to clean the tank. In another example, the blade may comprise a scraping member arranged to interfere with a wall and/or the bottom surface of the tank. The scraping member may displace solids out through the aperture arranged in the tank.

In another example, a container comprising a tank having a bottom surface having a non-zero slope relative to a horizontal support surface includes a scraper blade assembly slideably coupled to the sloped bottom surface of the tank. The tank may include an aperture arranged at the lowest portion of the slope of the bottom surface of the tank.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1A:
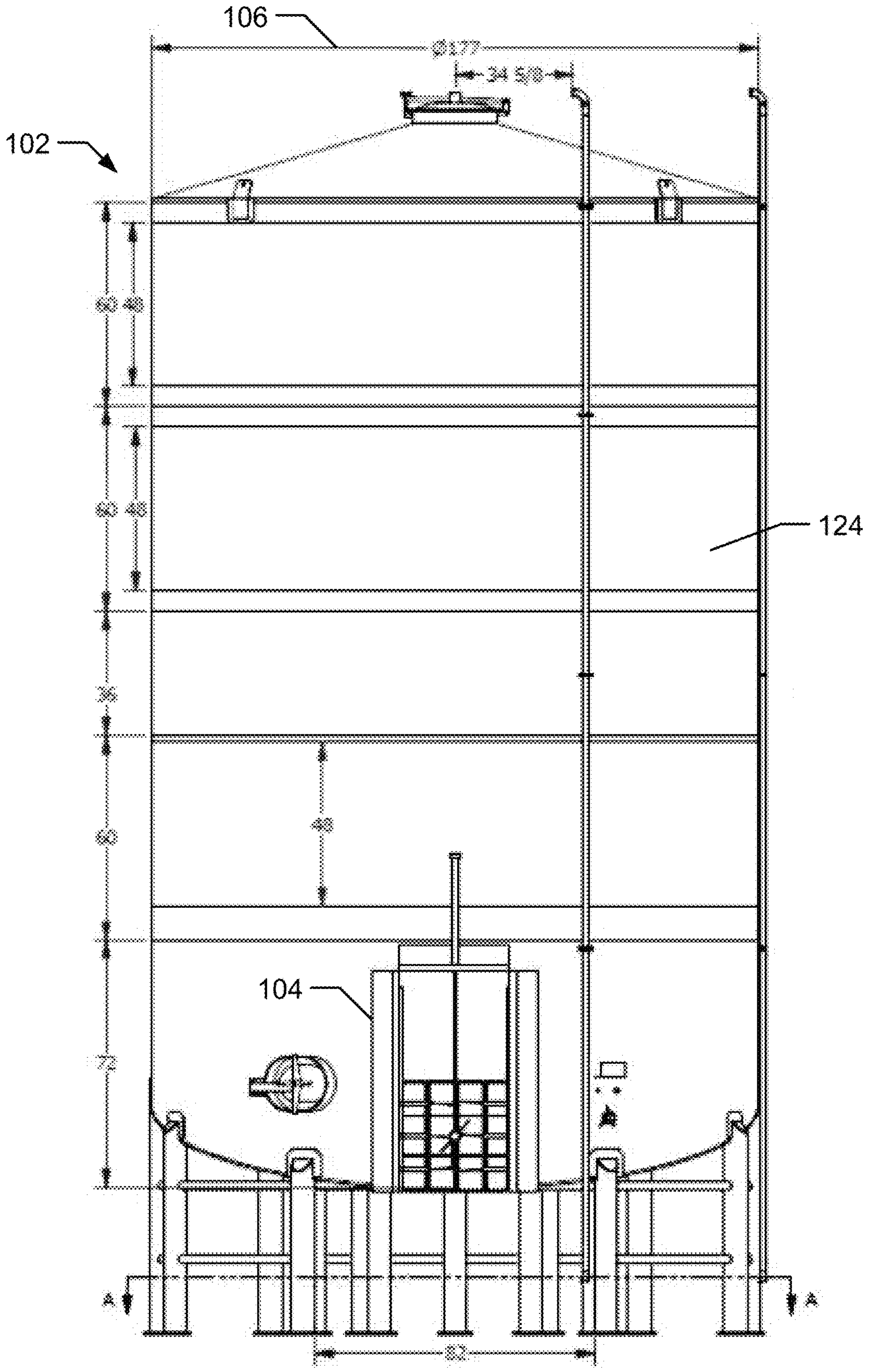
FIG. 1A illustrates a front view of an example self-cleaning tank.

This disclosure is directed to self-cleaning tanks that are less labor intensive to clean and take less time to clean than ordinary tanks, and do not require workers to enter the self-cleaning tanks at any time during the cleaning process. The self-cleaning tank may include a scraper blade assembly slideably coupled to the self-cleaning tank, which provides the necessary displacement of solids deposited on a bottom surface of the self-cleaning tank to clean out the self-cleaning tank, and which eliminates the need for any workers to enter the self-cleaning tank at any time. For example, a user may simply open a gate on the self-cleaning tank, and activate the scraper blade assembly. The activated scraper blade assembly displaces solids deposited on the bottom surface of the self-cleaning tank through the open gate and out of the self-cleaning tank, but without any worker entering the tank at any time. Stated otherwise, the scraper blade assembly may be activated by a worker outside of the self-cleaning tank to remove the solids deposited inside the self-cleaning tank, thus eliminating any need for workers to enter the self-cleaning tank to remove the solids.

The scraper blade assembly may include a blade having a leading edge opposite a trailing edge. The leading edge of the blade may displace solids deposited on the bottom surface of the self-cleaning tank through an aperture arranged in a wall of the self-cleaning tank to clean the self-cleaning tank. For example, the leading edge of the blade may slideably rotate on the bottom surface of the self-cleaning tank and push the solids out through an aperture arranged flush with the bottom surface of the self-cleaning tank.

The scraper blade assembly may include a blade having a portion of the leading edge and/or trailing edge of the blade that interferes or interfaces with the bottom surface of the self-cleaning tank. Moreover, the scraper blade assembly may include a portion of the leading edge and/or trailing edge of the blade that interferes or interfaces with a wall of the self-cleaning tank. For example, the scraper blade assembly may include one or more scraping members fixed to the blade, or formed integral with the blade, that interferes or interfaces with a wall and/or a bottom surface of the self-cleaning tank.

The portion of the leading edge and/or trailing edge of the blade that interferes with the wall of the self-cleaning tank may protrude out of the aperture when the blade passes along the aperture. For example, the portion the blade that interferes with the wall of the self-cleaning tank may be in a deflected or deformed state when interfering with the wall, and when passing along the aperture the portion of the blade that interferes with the wall of the self-cleaning tank may not be in a deflected or deformed state, penetrating the aperture. Stated otherwise, the portion of the blade that interferes with the wall is deflected back along the wall of the tank until the blade enters the aperture, at which point the blade juts out past the wall and into the aperture. In this way the portion of the blade that interferes with the wall of the self-cleaning tank may push the solids out of the opening as the portion of the blade that interferes with the wall of the self-cleaning tank passes along the aperture.

The scraper blade assembly may be rotatably coupled to a self-cleaning tank having a sloped bottom surface. The self-cleaning tank may include an aperture arranged in a wall of the self-cleaning tank. The aperture arranged in the wall having a portion arranged at a lowest portion of the slope of the bottom surface of the tank. For example, the self-cleaning tank may include an aperture at the bottom and flush with the bottom of the self-cleaning tank for removing the solids from the self-cleaning tank.

Illustrative Self-Cleaning Tank

FIG. 1A illustrates a front view of an example self-cleaning tank 102. The tank 102 may be fermentation tank, for example. For example, the tank 102 may be a red wine fermenter for holding a juice. The tank 102 may be a self-emptying or self-cleaning tank. For example, once the fermentation process has been completed, and the wine (juice) removed, the pomace remains in the bottom of the tank (e.g., tank 102). The pomace consists of grape skins, seeds, and spent yeast. This must be removed from the tank 102 where it will be subsequently pressed of any remaining juice and disposed of. Typically the pomace is removed manually with rakes and shovels, requiring considerable time and manpower. Moreover, typically a worker must enter a tank to manually rake and shovel the pomace out of the tank, presenting considerable hazardous conditions for the workers entering the tank. However, the self-cleaning tank 102 is faster, less labor intensive, and safer to empty the pomace from the self-emptying tanks 102 than traditional tanks. The tank may include a manway gate assembly 104 coupled to the tank 102. Any suitable manway gate may be used. By way of example and not limitation, suitable manway gate assemblies are disclosed in U.S. Provisional Patent Application No. 61/755,416, filed on Jan. 22, 2013, titled "Sliding—Locking Below Liquid Manway Door," which is incorporated by reference herein in its entirety. The tank 102 may have an outside diameter 106 of about 177 inches. The tank 102 may have a volume of about 29,100 gallons. While FIG. 1A illustrates a tank having an outside diameter 106 of about 177 inches and a volume of about 29,100 gallons, the tank may be of any size and or shape.

Figure 1B:
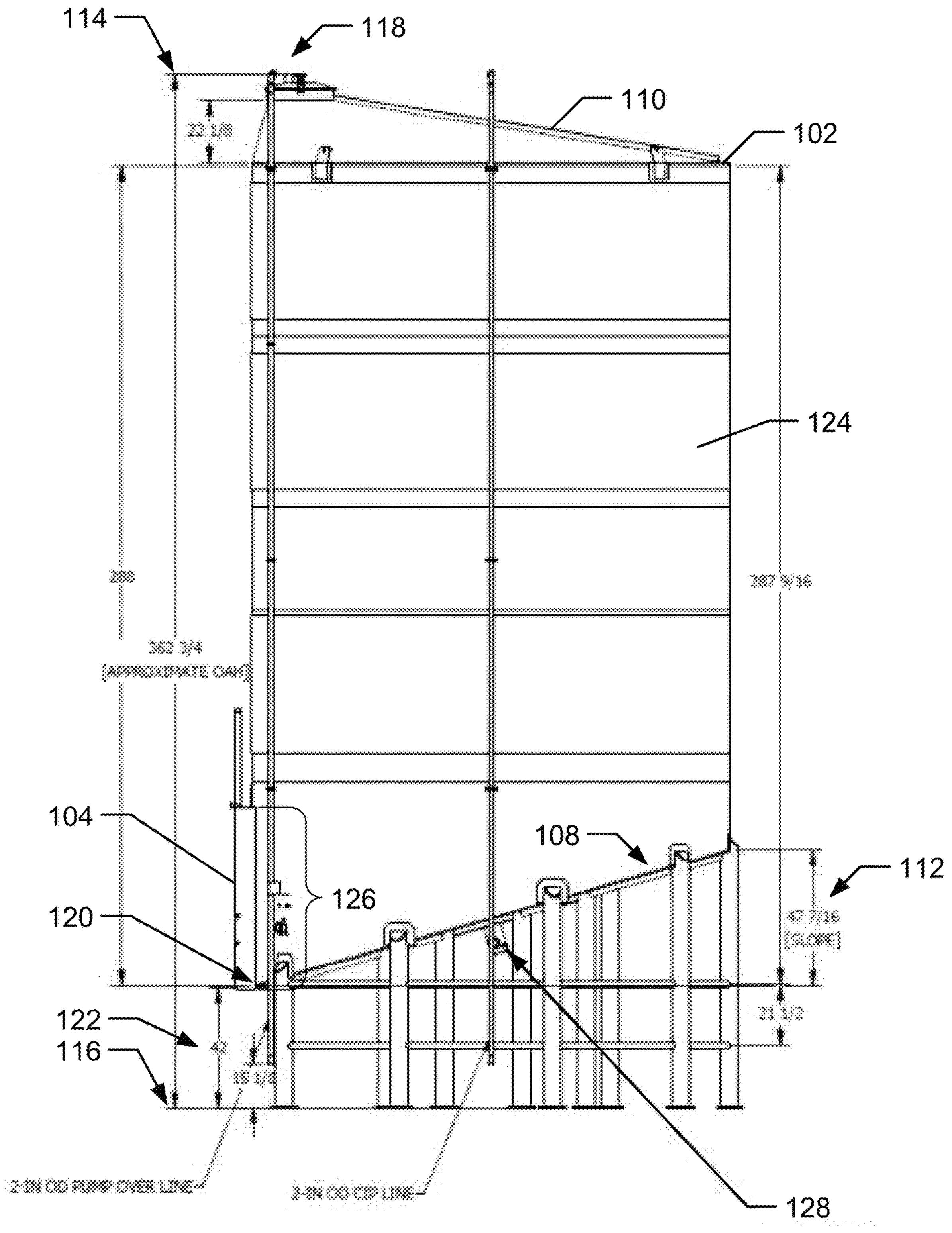
FIG. 1B illustrates a side view of the example self-cleaning tank shown in FIG. 1A.

FIG. 1B illustrates a side view of the example self-cleaning tank 102 shown in FIG. 1A. FIG. 1B illustrates the tank 102 including a bottom surface 108 opposite a top surface 110. In some examples the bottom surface 108 may be a substantially solid bottom surface. For example, the solid bottom surface may be void of perforations, cracks, filters, grates, or any other apertures. The bottom surface 108 may have a slope 112. For example, the bottom surface 108 may have a relatively steep slope (e.g., a rise of at least about 0.26 inches or a rise of at least about 47 inches over a run of about 177 inches) to provide for the pomace having somewhat the consistency of jam to slide out easily. In another example, the bottom surface 108 may have a relatively gentle slope (e.g., less than 0.26 inches). In some specific examples, relatively gentle slopes may include slopes from about a 0.1 inch rise to a 12 inch run to slopes of about a 2 inch rise to a 12 inch run to limit the length of an elliptical perimeter of the bottom surface. The bottom surface 108 has a perimeter and defines a first plane. The perimeter of the bottom surface 108 may depend on the diameter of the tank. For example, the perimeter of the bottom surface 108 may include a substantially curvilinear shape having a diameter of about 177 inches. The bottom surface 108 may have a substantially circular shape, elliptical shape, parabolic shape, etc. For example, the bottom surface may have an elliptical perimeter having a major axis longer than a minor axis. The first plane may have substantially the same slop as the bottom surface 108. For example, the first plane may have a steep slope (e.g., a rise of at least about 0.26 inches or a rise of at least about 47 inches over a run of about 177 inches) or have a gentle slope (e.g., less than 0.26 inches). While FIG. 1B illustrates the bottom surface 108 having a steep slope 112, the bottom surface 108 may have any slope. For example, the bottom surface 108 may be substantially horizontal (e.g., a rise of substantially 0 inches over a run of about 177 inches).

FIG. 1B illustrates the tank 102 having a height 114 of about 362 inches from surface of ground 116 to a top 118 of the tank 102. While FIG. 1B illustrates the tank 102 having a height of about 362 inches, the tank 102 may have any height. The lowest portion 120 of the slope 112 of the bottom surface 108 of the tank 102 may be arranged a distance 122 above the ground 116. For example, the lowest portion 120 of the slope 112 of the bottom surface 108 of the tank 102 may be arranged about 42 inches above the ground 116 to provide for placing a receptacle (e.g., box, container, bin, and/or conveyor) under the manway gate assembly 104. While FIG. 1B illustrates the tank 102 having a lowest portion arranged about 42 inches above the ground, the lowest portion of the ground may be arranged at any height above the ground. The manway gate assembly 104 may be fixed to the tank 102 proximate to the lowest portion 120 of the slope 112 of the bottom surface 108 of the tank 102 to provide for controlling the flow rate of product (e.g., pomace) emptying from the tank 102 to the receptacle.

FIGS. 1A and 1B illustrates a wall 124 fixed between the bottom surface 108 and the top surface 110. For example, the wall 124 may be fixed to an elliptical perimeter of the bottom surface 108 and between the bottom surface 108 and the top surface 110. An aperture 126 may be arranged in the wall 124 of the tank 102. The aperture 126 having a portion proximate to the lowest portion 120 of the slope 112 of the bottom surface 108 of the tank 102. In one example, the aperture 126 may be arranged in the wall 124 of the tank 102 and aligned with the major axis of the elliptical perimeter of the bottom surface of the tank 102. FIGS. 1A and 1B illustrate the manway gate assembly 104 arranged around the aperture 126 to empty the product held in the tank 102. For example, the aperture 126 and the manway gate assembly 104 may both be arranged flush with the lowest portion 120 of the slope 112 of the bottom surface 108 of the tank 102 to provide for displacing solids out of the tank 102. Stated otherwise a bottom portion of the manway gate assembly 104, a bottom portion of the aperture 126, and the lowest portion 120 of the slope of the bottom surface 108 of the tank 102 may form a substantially smooth planar surface to provide for displacing solids out of the tank 102.

FIG. 1B illustrates a motor and gear reduction 128 disposed underneath the bottom surface 108 of the tank 102. The motor and gear reduction 128 may be used to power a scraper blade assembly slideably coupled to the tank 102 (discussed in detail below with regard to FIG. 2). The motor may be about a 15 horsepower motor and the gear reduction may comprise a 400 to 1 gear reduction. In another example, the motor may be about a 7.5 horsepower motor and the gear reduction may comprise a 900 to 1 gear reduction. In yet another example, the motor may be a hydraulic motor and a separate (e.g., free standing and/or portable) hydraulic power unit (e.g., power pack) may removeably couple with the hydraulic motor.

Figure 2:
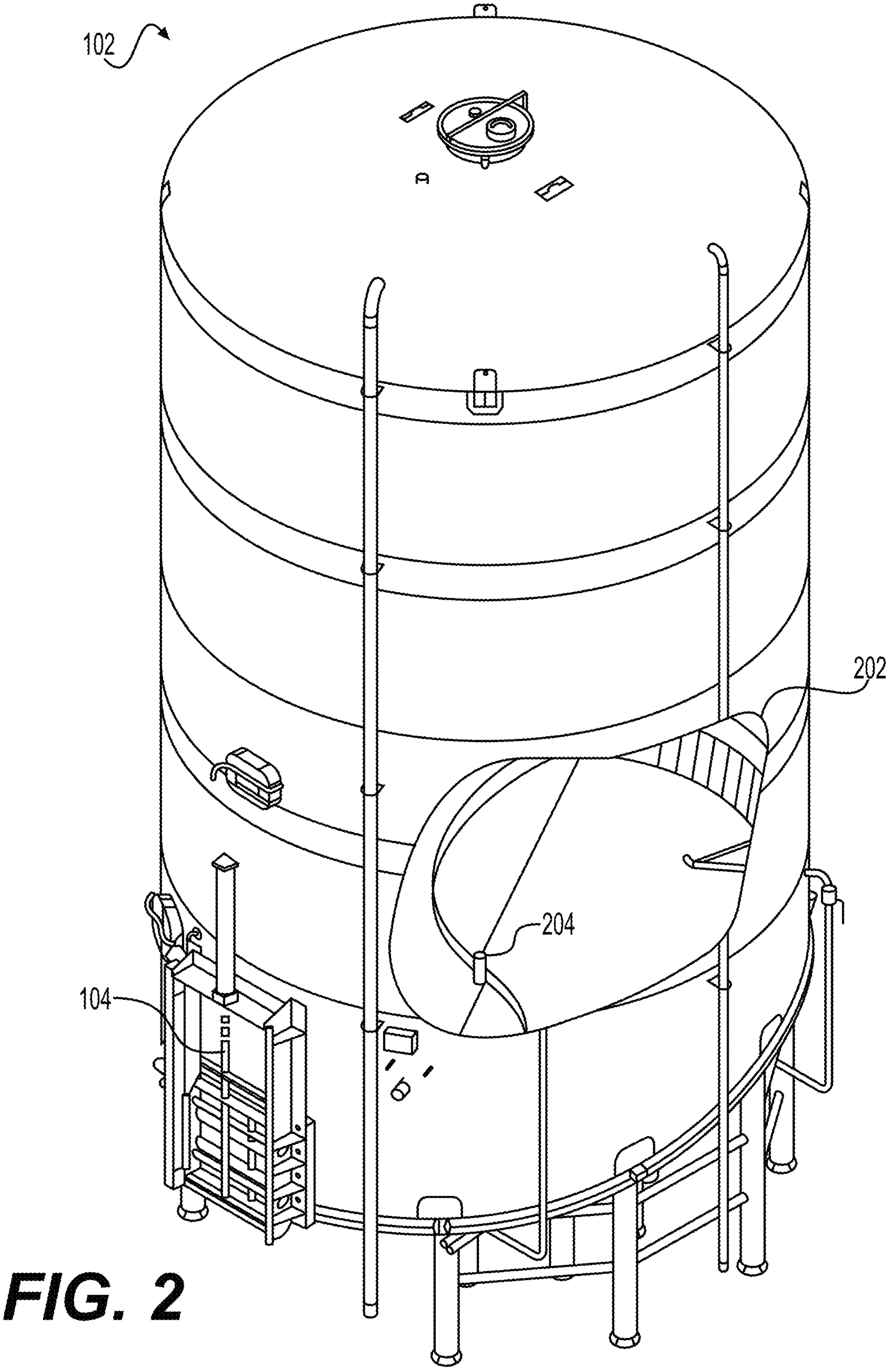
FIG. 2 illustrates a partial cutaway perspective view of the self-cleaning tank shown in FIGS. 1A and 1B.

FIG. 2 illustrates a cutaway view 202 of the self-cleaning tank 102 shown in FIGS. 1A and 1B. The cutaway view 202 illustrates a scraper blade assembly 204 slideably coupled to the tank 102. For example, the cutaway view 202 illustrates the scraper blade assembly 204 slideably coupled to the bottom surface 108 of the tank 102. The scraper blade assembly 204 may be rotatably coupled to the bottom surface 108 of the tank 102 to sweep the bottom surface 108 of the tank 102. For example, the scraper blade assembly 204 may be rotatably coupled proximate to a center of the bottom surface 108 of the tank 102, and powered by the motor and gear reduction 128 that sweeps a blade along the bottom surface 108 of the tank 102. While FIG. 2 illustrates the scraper blade assembly 204 rotatably coupled to the center of the bottom surface 108 of the tank 102, the scraper blade assembly 204 may be rotatably coupled to a perimeter of the tank 102. For example, the scraper blade assembly 204 may be slideably coupled to a track system arranged around a perimeter of the bottom surface 108. Moreover, the scraper blade assembly 204 may not be rotatably coupled to the tank 102. For example, the scraper blade assembly 204 may slide linearly on the bottom surface 108 of the tank 102. For example, the scraper blade assembly 204 may slide linearly from front to back of the tank 102. Depending on the desired esthetic and mechanical properties of the scraper blade assembly 204 and/or the tank 102, components may comprise metal, plastic, and/or ceramic. For example, the scraper blade assembly 204 and/or the tank 102 may comprise steel (e.g., stainless), copper, titanium, rubber, silicone, and/or Teflon.

Figure 3:
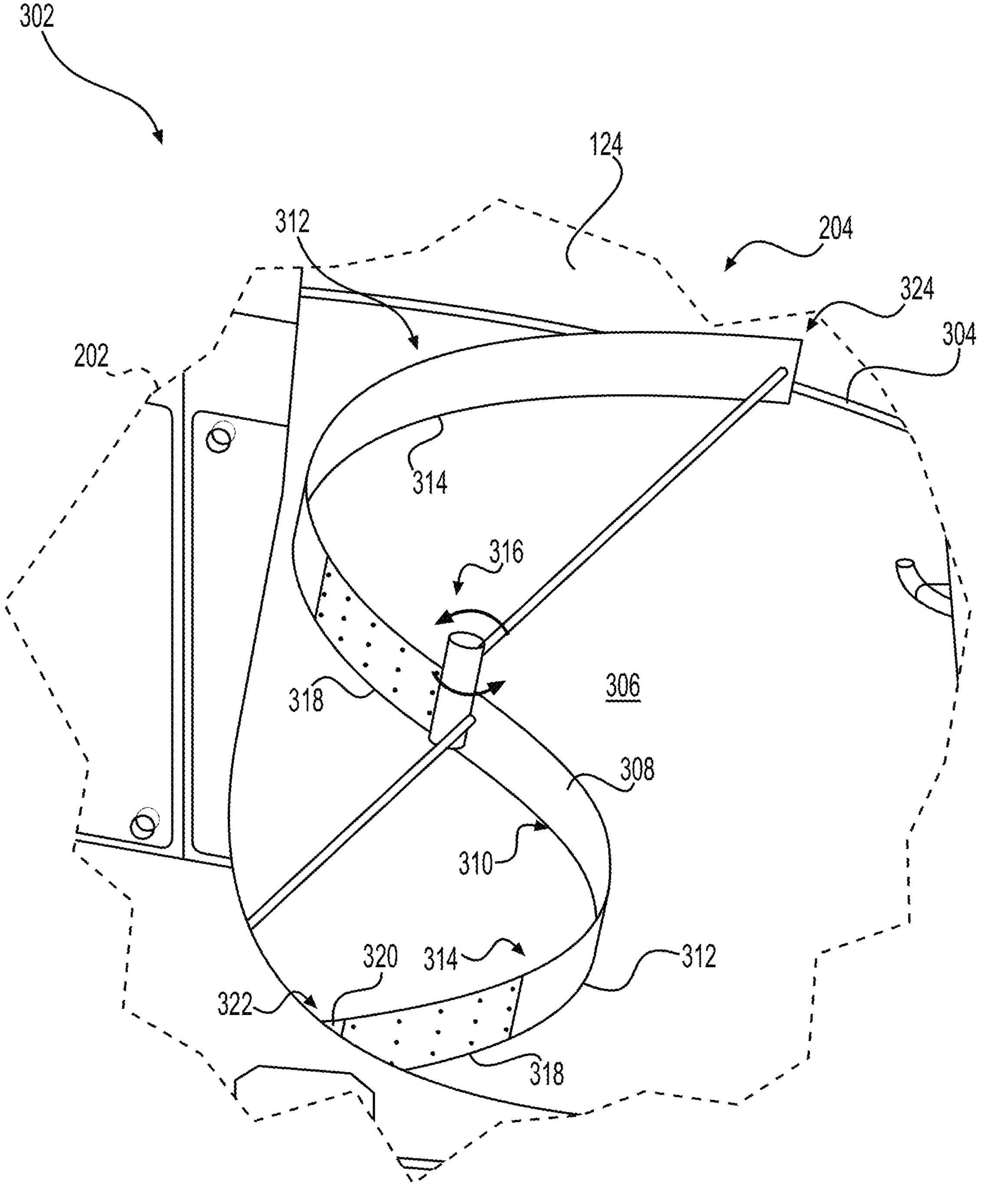
FIG. 3 illustrates a detail view of an example scraper blade assembly shown through a partial cutaway in the side of the self-cleaning tank.

FIG. 3 illustrates a detail view 302 of the example scraper blade assembly 204 shown in the cutaway view 202 of FIG. 2. FIG. 3 illustrates the bottom surface 108 having a perimeter 304 and defining a first plane 306. The wall 124 may be fixed to the perimeter 304 of the bottom surface 108. In one example, the bottom surface 108 may have an elliptical perimeter defining the first plane 306 and the wall 124 may be fixed to the elliptical perimeter of the bottom surface and between the bottom surface and the top surface. The scraper blade assembly 204 may include a blade 308 defining a second plane 310 parallel to the first plane 306. The blade 308 may include a leading edge 312 opposite a trailing edge 314. The blade 308 may rotate in a direction 316 towards the leading edge 312. FIG. 3 illustrates a portion 318 of the leading edge 312 of the blade 308 interfering with the bottom surface 108 of the tank 102. While FIG. 3 illustrates the portion 318 of the leading edge 312 of the blade 308 interfering with the bottom surface 108 of the tank 102, the portion 318 or another portion, different from the portion 318, may interfere with the bottom surface 108 of the tank 102. FIG. 3 illustrates a portion 320 of the leading edge 312 of the blade 308 may interfere with the wall 124 of the tank 102. While FIG. 3 illustrates the portion 320 of the leading edge 312 of the blade 308 interfering with the wall 124 of the tank 102, the portion 320 or another portion, different from the portion 318, may interfere with the wall 124 of the tank 102.

The portions 318 and 320 of the blade 308 may be scraping members formed of a material different from a material forming the blade 308. For example, the blade may be formed of metal (e.g., steel, stainless steel, aluminium, copper, brass, etc.) and the portions 318 and/or 320 may be scraping members formed of a plastic (e.g., a polyamide (PA), Acrylonitrile butadiene styrene (ABS), Poly(methyl methacrylate) (PMMA), Polyethylene terephthalate (PET), etc.). Moreover, the scraping member portions 318 and 320 and the blade 308 may be of formed of a single unit of material. For example, the scraping member portions 318 and 320 and the blade 308 may be formed of a single unit of metal, a single unit of plastic, a single unit of composite or the like. Further, the scraping member portions 318 and 320 may be the same or different material than the tank. For example, the scraping members could be chosen of a material softer than the tank material so that the scraping members don't wear through the bottom surface and/or wall of the tank. In one example, the portion 320 may be an extendable scraping member arranged at an end of the leading curvilinear surface to maintain contact with a wall fixed to an elliptical perimeter of the bottom surface of the tank. For example, when the blade is rotatably displaced in the second plane the extendable scraping member may recede to follow the wall of the tank when displaced along a minor axis of the elliptical perimeter of the bottom surface of the tank and may extend outward to maintain contact with the wall of the tank when displaced along a major axis of the elliptical perimeter of the bottom surface of the tank. The extendable scraping member may extend toward the wall of the tank when displaced along a major axis of the elliptical perimeter of the bottom surface of the tank to displace solids deposited along the elliptical perimeter of the bottom surface of the tank through the aperture arranged in the wall of the tank to clean the tank. The scraping member may, in some examples, protrude slightly from the aperture to ensure complete displacement of solids from the tank.

FIG. 3 illustrates the blade 308 having a substantially curvilinear shape. For example, FIG. 3 illustrates the blade 308 having a substantially elongated s-shape. The elongated s-shaped blade 308 having a first end 322 opposite a second end 324. FIG. 3 illustrates the substantially elongated s-shaped blade 308 spanning a width of the bottom surface 108 of the tank 102, and the first and second ends 322 and 324 disposed proximate to the wall 124 of the tank 102. While FIG. 3 illustrates the blade 308 having only one scraping member portion 320 fixed to the first end 322 of the blade 308, the blade 308 may include another scraping member fixed to the second end 322 of the blade 308. Moreover, while FIG. 3 illustrates the blade 308 having a curvilinear shape, the blade may have any shape suitable for displacing solids out of the tank 102. For example, the blade 308 may have a substantially rectilinear shape, x-shape, y-shape, u-shape, triangular shape, etc. The first and/or second ends 322 and 324 of the blade 308 may be made of a "spring" or "elastically deformable" material. A support member may be fixed between the pivot of the blade 308 and the first and/or second ends 322 and 324. For example, a rigid bar may be fixed between the first and/or second ends 322 and 324 to structurally support the first and/or second ends 322 and 324 against a high torque load.

Figure 4:
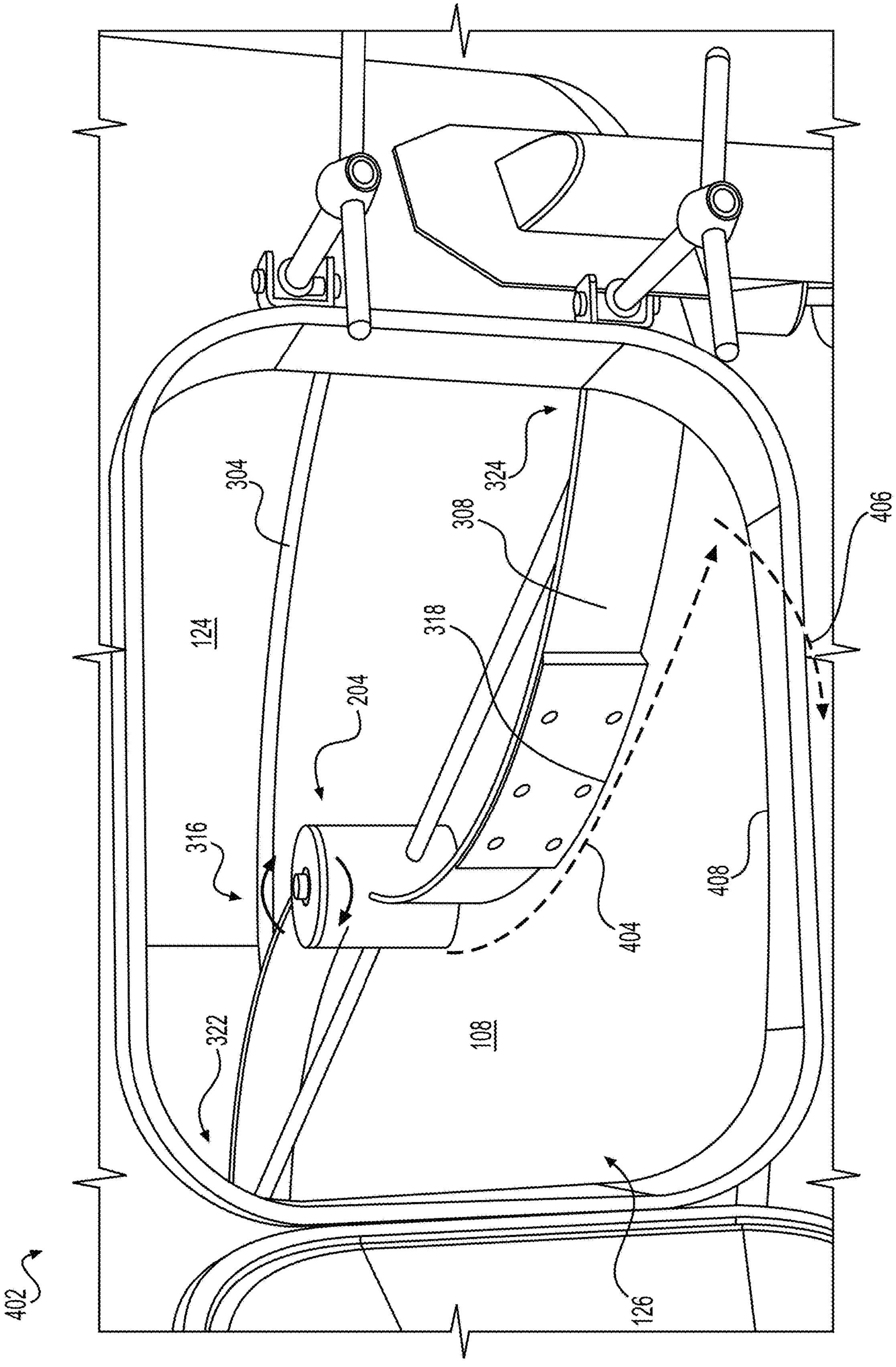
FIG. 4 illustrates a perspective view of an example scraper blade assembly shown slideably coupled to a bottom surface of a tank.

FIG. 4 illustrates a perspective view 402 of the scraper blade assembly 204 shown slideably coupled to the bottom surface 108 of a tank 102. FIG. 4 illustrates the leading edge 318 of the blade 308 arranged to displace solids deposited on the bottom surface 108 of the tank 102 through the aperture 126 arranged in the wall 124 of the tank 102 to clean the tank 102. For example, FIG. 4 illustrates the blade 308 rotating in the direction 316, and pushing the leading edge 318 of the blade 308 in the direction of the aperture 126. The blade 308 displaces the solids deposited on the bottom surface 108 of the tank 102 in a direction 404 towards the aperture 126. The scraping member portion 320 fixed to the first end 322 of the blade 308 displaces the solids out through the aperture 126. For example, the scraping member portion 320 fixed to the first end 322 of the blade 308 rotates in the direction 316 along the wall 124 in a deflected or deformed state until the scraping member portion 320 fixed to the first end 322 of the blade 308 penetrates the aperture 126. When the blade 308 rotates the scraping member portion 320 into the aperture 126, the scraping member portion 320 of the blade 308 may penetrate (i.e., protrude slightly from) the aperture 126. When the blade 308 rotates the scraping member portion 320 along the aperture 126 the scraping member portion 320 may extend out past the wall 124 of the tank 102 to displace the solids in a direction 406 out through the aperture 126. In another example, the scraping member may recede to follow the wall of the tank when displaced along a minor axis of the elliptical perimeter of the bottom surface of the tank and extend outward to maintain contact with the wall of the tank when displaced along a major axis of the elliptical perimeter of the bottom surface of the tank to displace the solids in a direction 406 out through the aperture 126. In another example, when the blade 308 rotates the scraping member portion 320 along the aperture 126 the scraping member portion 320 may not extend out past the wall 124 of the tank 102.

FIG. 4 illustrates a portion 408 of the aperture 126 arranged flush with the bottom surface 108 of the tank 102 to provide for displacing solids out of the tank 102. For example, FIG. 4 illustrates the bottom portion 408 of the aperture 126 and the bottom surface 108 of the tank 102 forming a substantially smooth planar surface to provide for the scraping member portion 320 to extend to and/or out past the wall 124 and displaces the solids in the direction 406 out through the aperture 126. The aperture 126 may have a substantially same radius as the wall 124 of the tank 102. Moreover, the aperture 126 may have a substantially planar shape.

Example Method of Using a Self-Cleaning Tank

Figure 5:
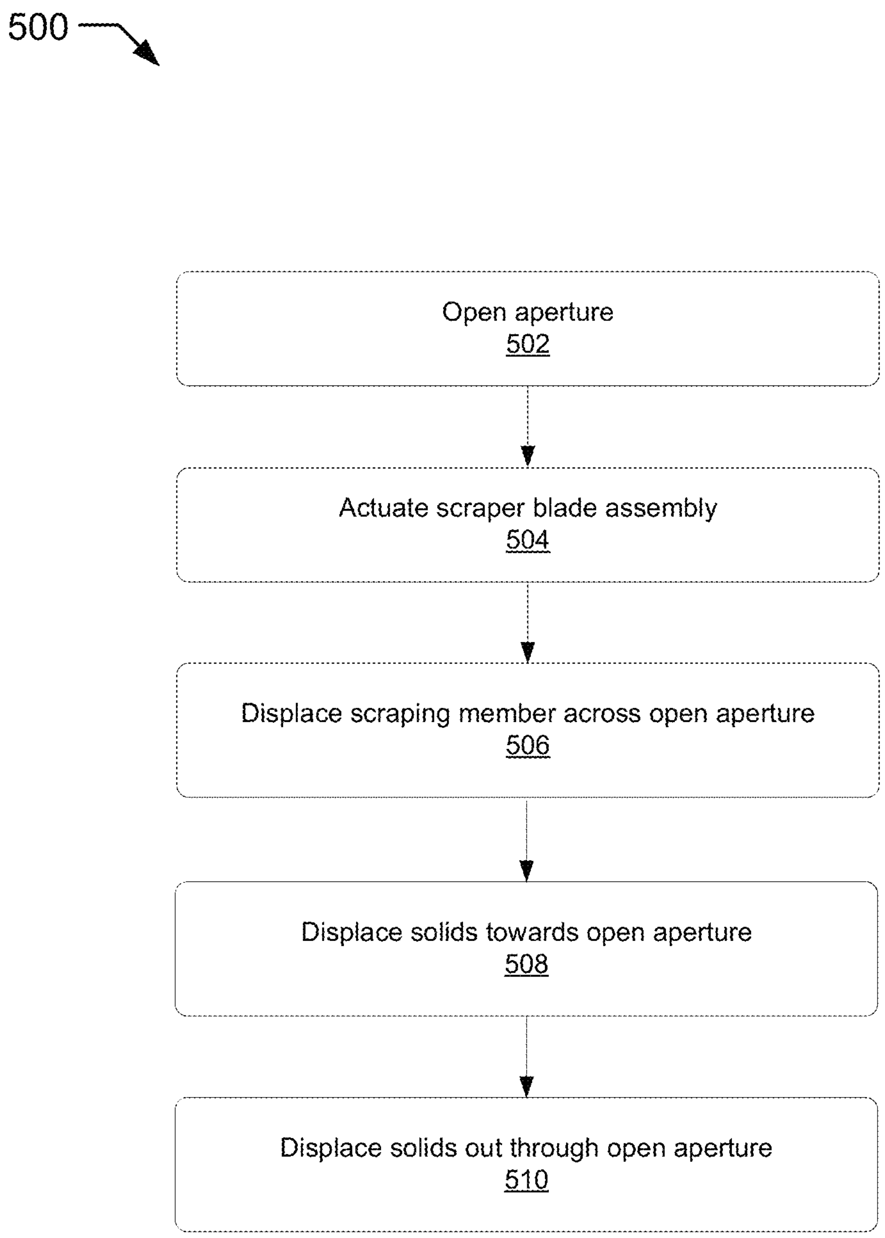
FIG. 5 is a flow diagram illustrating an example process of using a self-cleaning tank having an example scraper blade assembly.

FIG. 5 illustrates an example method 500 of using an example self-cleaning tank (e.g., self-cleaning tank 102) based at least in part on a scraper blade assembly (e.g., scraper blade assembly 204) slideably coupled to the tank. For instance, this process may be performed to empty and/or clean a self-emptying or self-cleaning tank, which has a bottom surface (e.g., bottom surface 108) having a slope (e.g., slope 112) and the scraper blade assembly slideably coupled to the bottom surface, which provides for a more efficient removal of pomace in the bottom of the tank. While FIG. 5 illustrates a method of using a self-cleaning tank configured to provide a faster, less labor intensive, and safer removal of pomace, this method may apply to using self-cleaning tanks configured for removal of other types of solids. For example, the self-cleaning tank may be used to provide efficient removal of petroleum solids, a septic solids, yeast solids etc.

Method 500 may include an operation 502, which represents opening an aperture (e.g., aperture 126) arranged in a tank to clean the tank. For example, operation 502 may include selectively opening a manway gate assembly (e.g., manway gate assembly 104). For example, a user may selectively slide the gate to an open position to open the tank. Method 500 may proceed to operation 504, which represents actuating a scraper blade assembly. For example, subsequent to opening the manway gate assembly, and while the aperture of the tank is open, a user may selectively activate the scraper blade assembly. In one example, the actuating of the scraper blade assembly, may include remotely actuating a motor (e.g., motor and gear reduction 128 or motor and gear reduction 606) coupled to the solid bottom surface of the tank, and rotating a shaft of the motor protruding from the solid bottom surface of the tank at substantially a right angle relative to the sloped bottom surface of the tank and substantially at an obtuse angle relative to a substantially planar surface of ground the tank stands on. In another example, the actuating of the scraper blade assembly, may include removeably coupling a separate (e.g., free standing and/or portable) hydraulic power unit (e.g., power pack) may to a hydraulic motor disposed underneath the bottom surface of the tank and/or energizing (e.g., turning on) the separate hydraulic power unit. Method 500 may include operation 506, which represents displacing a scraping member (e.g., scraping member portion 320) along a portion (e.g., portion 408) of the aperture arranged proximate to a lowest portion (e.g., lowest portion 120) of a slope (e.g., slope 112) of a bottom surface (e.g., bottom surface 108) of the tank. Method 500 may include operation 508, which represents displacing solids deposited on the bottom surface of the tank in a direction (e.g., direction 404) towards the aperture, via a blade (e.g., blade 308) rotatably coupled to the bottom surface of the tank.

Method 500 may be complete at operation 510, which represents displacing, via the scraping member, solids deposited on the bottom surface of the tank through the portion of the aperture arranged proximate to the lowest portion of the slope of the bottom surface of the tank.

Alternative Example Scraper Blade Assembly

Figure 6:
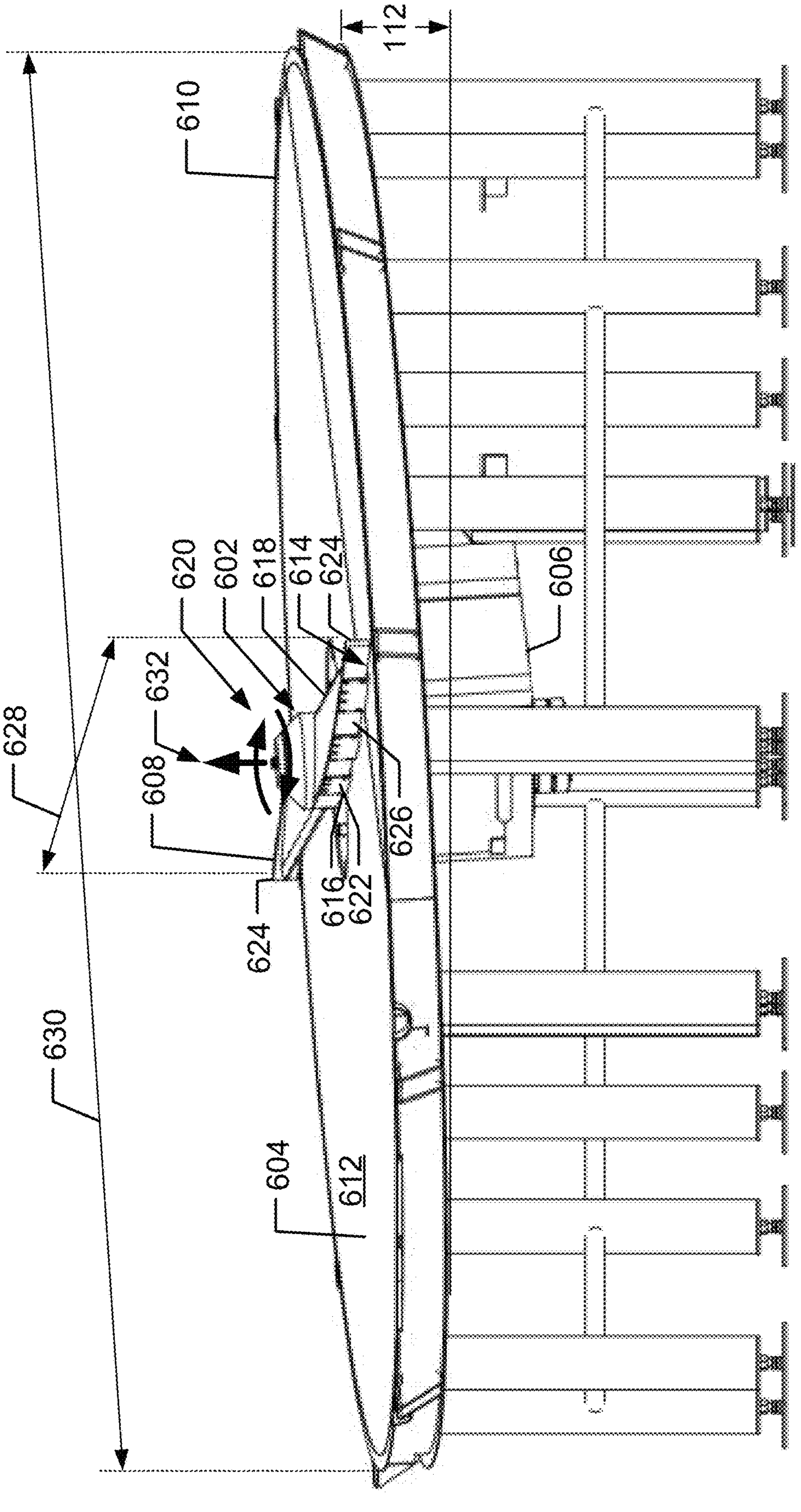
FIG. 6 and FIG. 7 illustrate perspective views of an alternative example scraper blade assembly coupled to a bottom surface of a tank.
Figure 7:
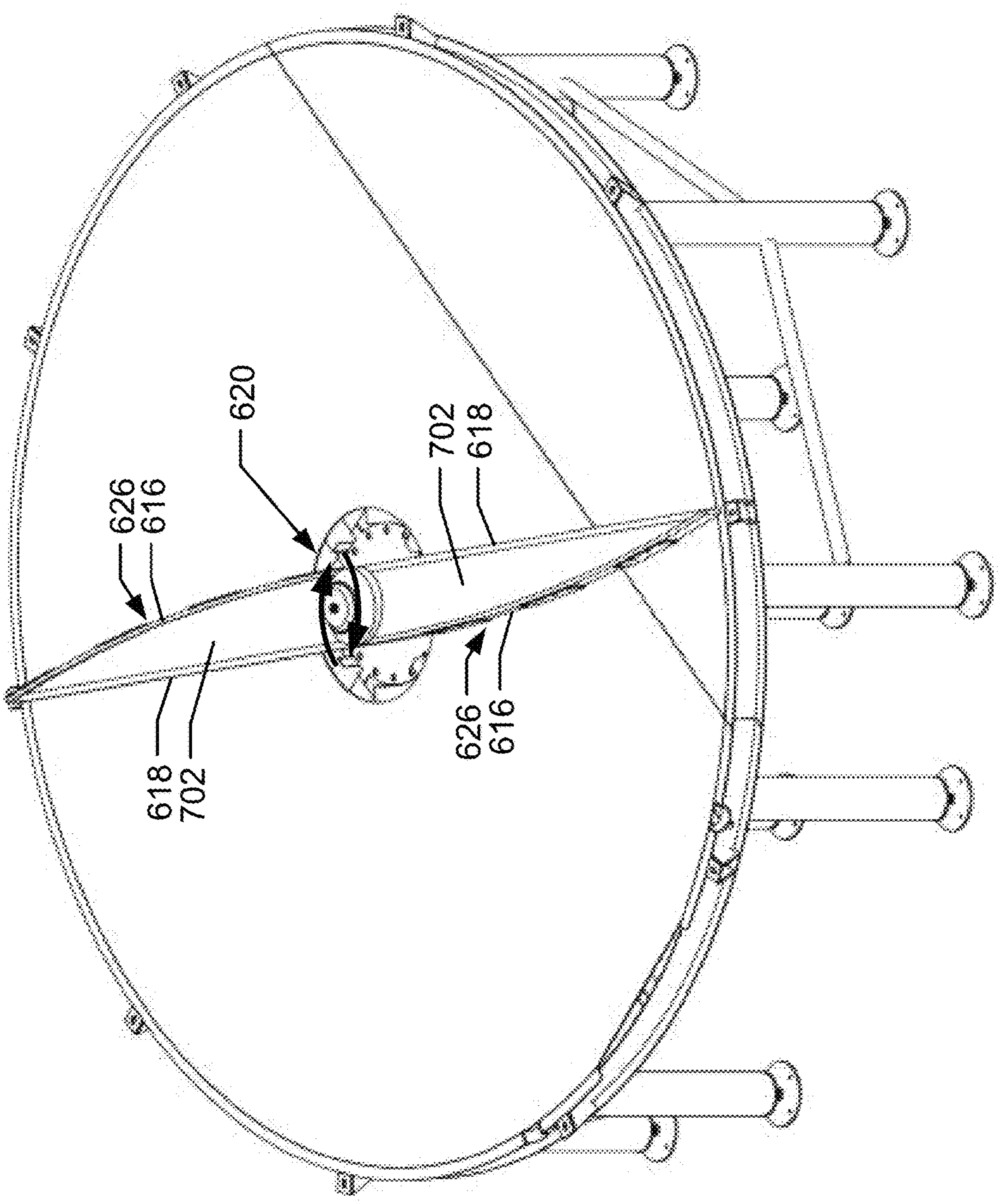

FIG. 6 and FIG. 7 illustrate perspective views of an alternative example, scraper blade assembly coupled to a bottom surface of a tank. FIG. 6 illustrates a scraper blade assembly 602 slideably coupled to a bottom surface 604 of a tank with the wall of the tank omitted for clarity. Similar to the bottom surface 108 discussed above with regards to FIG. 1B, in some embodiments, the bottom surface 604 may have a non-zero slope 112. For example, the bottom surface 604 may have a relatively gentle slope (e.g., at least about a 0.1 inch rise to a 12 inch run up to at most about a 2 inch rise to a 12 inch run). The relatively gentle slope limits the length of an elliptical perimeter of the bottom surface, and maximizes a volume of the tank. For example, the relatively gentle slope of the bottom surface 604 reduces the height and/or outside diameter (e.g., height 114 and/or outside diameter 106) of the tank as compared to a relatively steep slope where the height and/or outside diameter would have to be larger to accommodate the same volume of the tank.

Similar to the scraper blade assembly 204 discussed above with regards to FIG. 3, in some embodiments, the scraper blade assembly 602 may be rotatably coupled to the bottom surface 604 of the tank to sweep the bottom surface 108 of the tank. For example, the scraper blade assembly 602 may be rotatably coupled proximate to a center of the bottom surface 604 of the tank. The scraper blade assembly 602 may, for example, be powered by a motor and gear reduction 606 that sweeps a blade 608 along the bottom surface 604 of the tank. In some examples, the motor and gear reduction 606 may be coupled to the solid bottom surface 604 of the tank. For example, a gearbox of the motor and gear reduction 606 may be fastened via mechanical fasteners to a portion of an underside of the bottom surface 604 of the tank. In one example, the gearbox may be fastened to a portion of the stand adjacent to the underside of the bottom surface 604 of the tank. Further, a gasket (e.g., a dry seal) may be arranged around a drive shaft extending from the gearbox and protruding through the stand and into the bottom surface 604 of the tank. Stated otherwise, a gasket may be arranged between the drive shaft and the bottom surface 604 of the tank.

In other examples, other drive mechanisms may be used to drive the scraper blade assembly 602. For example, a hydraulic motor disposed underneath the bottom surface of the tank may drive the scraper blade assembly 602 when a separate hydraulic power unit, removeably coupled to the hydraulic motor and arranged proximate to the tank, is energized or turned on.

The bottom surface may have an elliptical perimeter 610 defining a first plane 612 and the blade 608 may define a second plane 614 parallel to the first plane 612. The blade 608 may include a leading edge 616 opposite a trailing edge 618. The blade 608 may rotate in a direction 620 towards the leading edge 616. A portion 622 of the leading edge 312 of the blade 608 may interfere with the bottom surface 604 of the tank. Similar to the scraper blade assembly 204 discussed above with regards to FIG. 3, in some embodiments, the portions 622 of the blade 608 may be scraping members formed of a material different from a material forming the blade 608. For example, the blade 608 may be formed of metal (e.g., steel, stainless steel, aluminium, copper, brass, etc.) and the portions 622 may be scraping members formed of a plastic (e.g., a polyamide (PA), Acrylonitrile butadiene styrene (ABS), Poly(methyl methacrylate) (PMMA), Polyethylene terephthalate (PET), etc.). The blade 608 may include an extendable scraping member 624 arranged at an end of a leading curvilinear surface 626 to contact a wall (not shown) fixed to the elliptical perimeter 610 of the bottom surface 604 of the tank. For example, when the blade 608 is rotatably displaced the extendable scraping member 624 may recede to follow the wall of the tank when displaced along a minor axis 628 of the elliptical perimeter 610 of the bottom surface 604 of the tank and may extend outward to maintain contact with the wall of the tank when displaced along a major axis 630 of the elliptical perimeter 610 of the bottom surface of the tank to displace solids deposited along the elliptical perimeter of the bottom surface of the tank through the aperture arranged in the wall of the tank to clean the tank. In one example, the minor axis 628 may be about 177 inches, and the major axis 630 may be about 178 inches. In another example, the blade 608 may not include an extendable scraping member 624. For example, the blade 608 may not include the extendable scraping member 624, and when the blade 608 is rotatably displaced the blade 608 may be free of contact with the wall of the tank.

FIG. 6 illustrates examples in which the motor and gear reduction 606 have a drive shaft 632 protruding from the solid bottom surface 604 of the tank at a substantially right angle relative to the slope of the solid bottom surface. The drive shaft 632 may couple with the blade 608 of the scraper blade assembly 602. In other examples however, a hydraulic motor may be disposed underneath the solid bottom surface 604 of the tank and the hydraulic motor may have the drive shaft 632 protruding from the solid bottom surface 604. In the example where a hydraulic motor has a drive shaft 632 protruding from the solid bottom surface 604 of the tank at a substantially right angle relative to the slope of the solid bottom surface, a portable hydraulic power unit may removeably couple with the hydraulic motor to power the hydraulic motor to rotate the blade 608 in a direction 620 towards the leading edge 616.

FIG. 7 illustrates the scraper blade assembly 602 may include a trailing support structure 702 arranged behind the leading curvilinear surface 626 of the blade 608. For example, a rigid plate may be fixed behind the leading curvilinear surface 626 of the blade 608 to structurally support leading curvilinear surface 626 against a high torque load. The leading curvilinear surface 626 of the blade 608 may have a slope steep enough to push the deposited solids in a direction towards an aperture arranged in the wall of the tank but not too steep to trap deposited solids against the wall of the tank. For example, the slope of the leading curvilinear surface 626 may be at least about a 6 degree angle from a centerline of the blade 608 to at most about a 24 degree angle from a centerline of the blade. In one example, the slope of the leading curvilinear surface 626 may be at least about a 12 degree angle from a centerline of the blade 608. In another example, the slope of the leading curvilinear surface 626 may be at least about a 15 degree angle from a centerline of the blade 608. While FIG. 7 illustrates the scraper blade assembly 602 including a leading curvilinear surface 626, the leading surface of the blade 608 may be substantially rectilinear.

Figure 8:
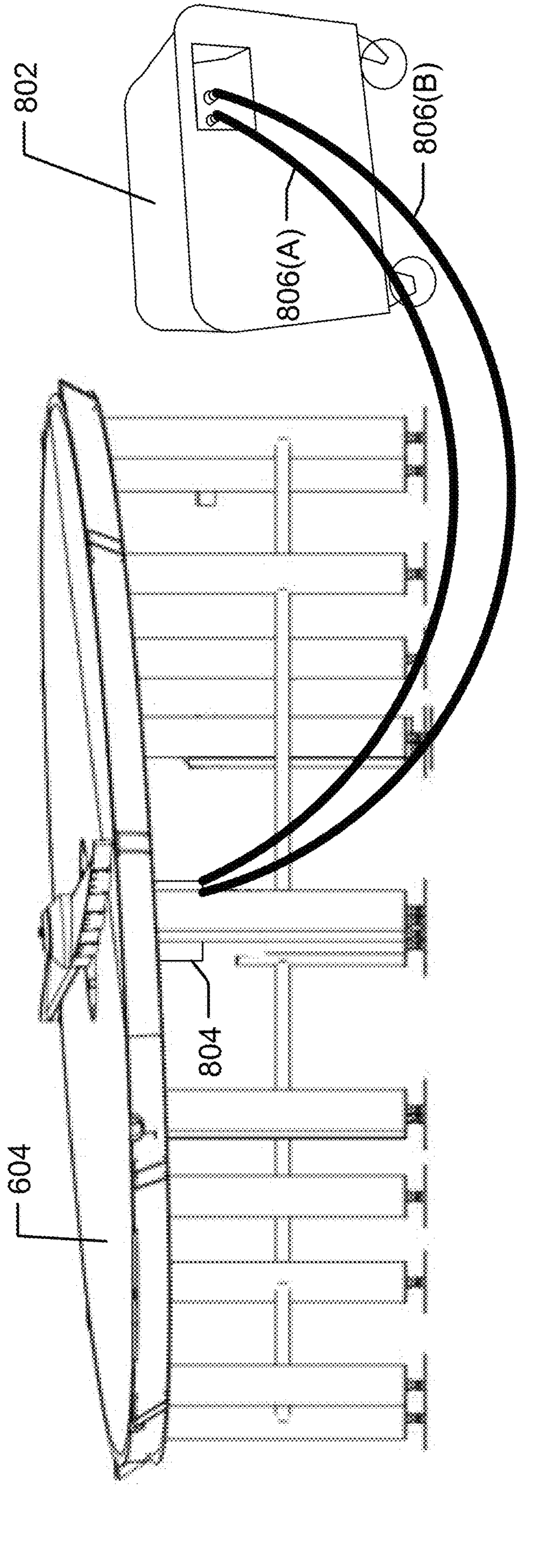
FIG. 8 illustrates a perspective view of a portable hydraulic power unit removeably coupled to a hydraulic motor disposed underneath a solid bottom surface of a tank.

FIG. 8 illustrates examples in which a hydraulic power unit 802 may be coupled to a hydraulic motor 804 disposed underneath the solid bottom surface 604 of a tank with the wall of the tank omitted for clarity. The hydraulic power unit 802 may be a portable hydraulic power unit and may be positioned adjacent to the tank and removeably coupled to the hydraulic motor 804 via one or more hydraulic lines 806(A) and 806(B). In one example, the one or more hydraulic lines 806(A) and 806(B) may removeably couple with the portable hydraulic power unit 802 and/or the hydraulic motor 804 via quick disconnect hydraulic fittings. In examples where the portable hydraulic power unit 802 is removeably couplable to a hydraulic motor 804 disposed underneath the solid bottom surface 604 of a tank, the portable hydraulic power unit 802 may be used to power other hydraulic motors 804 disposed underneath other tanks. For example, a single portable hydraulic power unit may be used to power a first hydraulic motor of a first tank and then used to power a second hydraulic motor of a second tank. For example, after the first tank is clean, the portable hydraulic power unit may be disconnected from the first hydraulic motor and subsequently connected to the second hydraulic motor on the second tank to clean the second tank.

In another example, a hydraulic power unit 802 may be used to power a plurality of hydraulic motors 804 disposed underneath a plurality of tanks. For example, one or more manifolds and/or valves may be communicatively coupled with a single hydraulic power unit 802, and communicatively coupled to the plurality of hydraulic motors 804 disposed underneath the plurality of tanks. The hydraulic power unit 802 may be fixed at a central location proximate to the plurality of tanks. Hydraulic lines (e.g., hydraulic lines 806(A) and 806(B)) may be coupled with each of the hydraulic motors 804 disposed underneath each of the tanks and the one or more banks of manifolds and/or valves. For example, hydraulic lines from each of the individual hydraulic motors 804 may be communicatively coupled to a manifold mounted on the hydraulic power unit. A front portion of the one or more manifolds and/or valves may be communicatively coupled to the hydraulic power unit 802. The front portion of the one or more manifolds and/or valves may be communicatively coupled with a main hydraulic pressure supply line and a main hydraulic pressure return line. A back portion of the one or more manifolds and/or valves may include one or more hydraulic servo valves. For example, the back portion of the one or more manifolds and/or valves may include the same quantity of hydraulic servo valves as the quantity of tanks. Any number of tanks could be communicatively coupled to the hydraulic power unit 802. For example, one hydraulic power unit 802 may be utilized to operate about 20 tanks. A programmable logic controller (PLC) may be used to control the one or more manifolds and/or valves. For example, a PLC may be used to control one or more hydraulic servo valves. Further, the PLC may be used to control the hydraulic power unit 802, a manway gate assembly (e.g., the manway gate assembly 104 coupled to the tank 102), a conveyor arranged with the manway gate assembly, a pump (e.g., a water pump), or other equipment arranged with the tanks. In one example, an operator may program the PLC to operate and engage a scraper blade assembly (e.g., scarper blade assembly 204 and/or scraper blade assembly 602). The programmed PLC may open the appropriate servo valve, allowing pressurized fluid to flow to the scraper blade assembly and turn the scraper blade assembly. In another example, an operator may manually operate the appropriate servo valve to engage a scraper blade assembly. Speed and torque of the scraper blade assembly may be controlled via the servo valves. A pump of the hydraulic power unit 802 may be a constant flow and pressure, or the pump of the hydraulic power unit 802 may be a more efficient variable pump. The direction of rotation of the scraper blade assembly may be controlled by the pump of the hydraulic power unit 802 and/or the one or more manifolds and/or valves. The size of the hydraulic power unit, pump, and/or hydraulic lines may vary depending on a quantity of the tanks, a size of each of the tanks, and/or the scraper blade assemblies.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A method comprising:

supplying power to a first hydraulic motor via a hydraulic power unit, the first hydraulic motor being attached beneath a first tank, and the hydraulic power unit being separate from the first tank, the first tank including:

a first top surface;

a first bottom surface opposite the first top surface;

a first wall fixed between the first bottom surface and the first top surface; and a first aperture located in the first wall;

the first hydraulic motor being operatively coupled to a first scraper blade assembly including a first scraper blade rotatably coupled to the first bottom surface, wherein when the first hydraulic motor is powered via the hydraulic power unit the first scraper blade is rotatably displaced along the first bottom surface;

disconnecting the hydraulic power unit from the first hydraulic motor;

connecting the hydraulic power unit to a second hydraulic motor, the second hydraulic motor being attached beneath a second tank, the hydraulic power unit being separate from the second tank, the second tank including:

a second top surface;

a second bottom surface opposite the second top surface;

a second wall fixed between the second bottom surface and the second top surface; and a second aperture located in the second wall;

supplying power to the second hydraulic motor via the hydraulic power unit; and the second hydraulic motor being operatively coupled to a second scraper blade assembly including a second scraper blade rotatably coupled to the second bottom surface, wherein when the second hydraulic motor is powered via the hydraulic power unit the second scraper blade is rotatably displaced along the second bottom surface.

2. The method of claim 1, wherein when the first scraper blade is rotatably displaced along the first bottom surface, a first leading surface of the first scraper blade displaces first solids deposited on the first bottom surface in a direction towards the first wall to displace the first solids deposited through the first aperture.

3. The method of claim 1, wherein when the second scraper blade is rotatably displaced along the second bottom surface, a second leading surface of the second scraper blade displaces second solids deposited on the second bottom surface in a direction towards the second wall to displace the second solids through the second aperture.

4. The method of claim 1, wherein the first tank further includes a first gate located adjacent to the first aperture, the first gate being selectively movable between an open position and a closed position.

5. The method of claim 1, wherein the second tank further includes a second gate located adjacent to the second aperture, the second gate being selectively movable between an open position and a closed position.

6. The method of claim 1, wherein the first wall is a first vertical wall fixed to a first perimeter of the first bottom surface, at a first location between the first bottom surface and the first top surface, and the first bottom surface extends substantially around a second perimeter of the first vertical wall; or the second wall is a second vertical wall fixed to a third perimeter of the second bottom surface, at a second location between the second bottom surface and the second top surface, and the second bottom surface extends substantially around a third perimeter of the second vertical wall.

7. The method of claim 6, wherein the first tank further includes a first gate located adjacent to the first aperture, the first gate being selectively movable at least vertically between an open position and a closed position; or wherein the second tank further includes a second gate located adjacent to the second aperture, the second gate being selectively moveable at least vertically between an open position and a closed position.

8. A method comprising:

supplying, via a hydraulic power unit, first power to a first hydraulic motor to rotatably displace a first scraper blade of a first scraper blade assembly along a first bottom surface of a first tank;

the first hydraulic motor being operatively coupled to the first scraper blade assembly including the first scraper blade rotatably coupled to the first bottom surface of the first tank, wherein when the first hydraulic motor is powered by the hydraulic power unit the first scraper blade is rotatably displaced along the first bottom surface of the first tank;

disconnecting the hydraulic power unit from the first hydraulic motor;

connecting the hydraulic power unit to a second hydraulic motor;

supplying power to the second hydraulic motor with the hydraulic power unit; and the second hydraulic motor being operatively coupled to a second scraper blade assembly including a second scraper blade rotatably coupled to a second bottom surface of a second tank, wherein when the second hydraulic motor is powered by the hydraulic power unit the second scraper blade is rotatably displaced along the second bottom surface of the second tank.

9. The method of claim 8, wherein based at least in part on the first scraper blade being rotatably displaced along the first bottom surface, a first leading surface of the first scraper blade displaces first solids deposited on the first bottom surface in a direction towards a first wall of the first tank to displace the first solids through a first aperture located in the first wall.

10. The method of claim 8, wherein based at least in part on the second scraper blade being rotatably displaced along the second bottom surface, a second leading surface of the second scraper blade displaces second solids deposited on the second bottom surface in a direction towards a second wall of the second tank to displace the second solids through a second aperture located in the second wall.

11. The method of claim 8, wherein the first tank further includes a first gate located adjacent to a first aperture disposed through a first wall of the first tank, the first gate being selectively movable between an open position and a closed position.

12. The method of claim 8, wherein the second tank further includes a second gate located adjacent to a second aperture disposed through a second wall of the second tank, the second gate being selectively movable between an open position and a closed position.

13. The method of claim 8, wherein the first tank includes a first vertical wall disposed around a first perimeter of the first bottom surface, at a location and between the first bottom surface and a first top surface of the first tank, and the first bottom surface extends substantially around a second perimeter of the first vertical wall, wherein a first aperture is disposed in the first vertical wall; or wherein the second tank includes a second vertical wall disposed around a second perimeter of the second bottom surface, at a location and between the second bottom surface and a second top surface of the second tank, and the second bottom surface extends substantially around a third perimeter of the second vertical wall, wherein a second aperture is disposed in the second vertical wall.

14. The method of claim 13, wherein the first tank further includes a first gate located adjacent to the first aperture in the first vertical wall of the first tank, the first gate being selectively movable at least vertically between an open position and a closed position; or wherein the second tank further includes a second gate located adjacent to the second aperture in the second vertical wall of the second tank, the second gate being selectively movable at least vertically between an open position and a closed position.

15. A method comprising:

supplying power to a first hydraulic motor of a first tank via a hydraulic power unit, the hydraulic power unit being separate from the first tank and operatively coupled to a first scraper blade assembly including a first scraper blade rotatably coupled to a first bottom surface of the first tank, wherein the first scraper blade is rotatably displaced along the first bottom surface based on the power being supplied to the first hydraulic motor;

disconnecting the hydraulic power unit from the first hydraulic motor; and connecting the hydraulic power unit to a second hydraulic motor of a second tank, the hydraulic power unit being separate from the second tank and operatively coupled to a second scraper blade assembly including a second scraper blade rotatably coupled to a second bottom surface of the second tank, wherein the second scraper blade is rotatably displaced along the second bottom surface based on the power being supplied to the second hydraulic motor.

16. The method of claim 15, wherein based at least in part on the first scraper blade being rotatably displaced along the first bottom surface, a first leading surface of the first scraper blade displaces first solids deposited on the first bottom surface in a direction towards a first wall of the first tank to displace the first solids through a first aperture located in the first wall.

17. The method of claim 16, wherein the first tank includes a first gate located adjacent to the first aperture in the first wall, the first gate being selectively movable between an open position and a closed position.

18. The method of claim 15, wherein based at least in part on the second scraper blade being rotatably displaced along the second bottom surface, a second leading surface of the second scraper blade displaces second solids deposited on the second bottom surface in a direction towards a second wall of the second tank to displace the second solids through a second aperture located in the second wall.

19. The method of claim 18, wherein the second tank includes a second gate located adjacent to the second aperture in the second wall, the second gate being selectively movable between an open position and a closed position.

20. The method of claim 15, wherein at least one of:

the first hydraulic motor is attached beneath the first tank; or the second hydraulic motor is attached beneath the second tank.

* * * * *